United States Patent [19]

Thwaites et al.

[11] Patent Number: 4,570,780
[45] Date of Patent: * Feb. 18, 1986

[54] PROPELLING AND BRAKING APPARATUS FOR A ZERO PRESSURE ACCUMULATOR

[75] Inventors: John A. Thwaites, Jackson, N.J.; Hyman Miller, Brooklyn, N.Y.; Ronald A. Ferrara, Manalapan, N.J.

[73] Assignee: Contran Conveyors & Systems, Inc., Rahway, N.J.

[*] Notice: The portion of the term of this patent subsequent to Jun. 16, 1998 has been disclaimed.

[21] Appl. No.: 646,426

[22] Filed: Aug. 31, 1984

Related U.S. Application Data

[63] Continuation-in-part of Ser. No. 377,694, May 13, 1982, abandoned.

[51] Int. Cl.[4] .............................................. B65G 13/06
[52] U.S. Cl. ..................................... 198/781; 198/790
[58] Field of Search ......................................... 198/781

[56] References Cited

U.S. PATENT DOCUMENTS 4,273,239  6/1981  Thwaites et al. .................. 198/781
4,278,166  7/1981  Pirro .................................... 198/781

Primary Examiner—Robert J. Spar
Assistant Examiner—Jonathan D. Holmes
Attorney, Agent, or Firm—Sachs & Sachs

[57] ABSTRACT

A propelling and braking apparatus for a zero pressure accumulator conveyor includes a driven belt normally in intimate contact with a plurality of supporting rollers and a braking device disposed proximate thereto. Both the driven belt and the braking device apparatus are disposed between and beneath the supporting rollers and are resiliently mounted to a mounting bracket which is adapted to be affixed to one of the side rails of the conveyor. By filling an expansible tube with a pressurized fluid, the driven belt is removed from intimate contact with the supporting rollers and the braking device is caused to come into contact therewith applying braking forces thereto, thereby preventing contact between articles moving along a conveyor.

3 Claims, 4 Drawing Figures

1

PROPELLING AND BRAKING APPARATUS FOR A ZERO PRESSURE ACCUMULATOR

This application is a continuation-in-part of application Ser. No. 377,694 filed on May 13, 1982 by J. A. Thwaites, et al, presently abandoned.

BACKGROUND OF THE INVENTION

1. Field of the Invention

The present invention relates to propelling and braking apparatuses for a zero pressure accumulator and, more particularly, to an accumulator conveyor in which the supporting rollers are normally in intimate contact with the propelling force and when the propelling force is removed therefrom by inflating an expansible tube disposed between the propelling and braking apparatus, a braking force is applied to a plurality of the article supporting rollers.

2. Description of the Relevant Art

The use of an expansible tube device in combination with a pressurized pneumatic apparatus for controlling the propulsion of articles along a conveyor system is disclosed in U.S. Pat. No. 3,770,102 issued to DeGood on Nov. 6, 1973. The patent to DeGood discloses an accumulator conveyor having a powered propelling member passing through a plurality of independent operating zones arranged in tandem along the conveyor. In each zone the propelling member is shiftable between an article propelling and an article non-propelling position by pneumatically actuated pressure rollers acting on a propelling member. A valve operated by an article detecting sensor in each zone, operates a supply or exhausts fluid pressure to the actuators. An auxiliary valve system connected between the secondary pressure source and the actuators operates to shift all of the operating zones into an article propelling position, thereby overriding the accumulative function of the conveyor.

In U.S. Pat. No. 3,724,642 issued to DeGood on Apr. 3, 1973, there is disclosed a powered roller accumulator similar to the one discussed above. In addition, the patent also discloses a braking device which engages the powered rollers in order to stop the rotation when the propelling member is shifted to a non-driving position, thereby preventing movement of articles along the conveyor.

In U.S. Pat. No. 4,278,166 there is disclosed an apparatus which includes drive wheels which have a peripheral drive surface adapted for driving engagement with at least one carrier roller. An annular groove is found in the drive surface of each drive wheel and receives a drive cable therein, with the wheels formed to increase frictional gripping between the drive wheels and the carrier rollers. The drive wheels are each pivotally moved into and out of engagement with the carrier rollers by an independent fluid pressure activator. A braking mechanism mechanically coupled to the drive wheel mounting bracket applies braking forces to each roller contacted by the drive roller by pivotal movement.

However, all of the disclosed systems apply a braking apparatus to a singular roller in each tandem section of the conveyor. If additional rollers are to be afforded braking pressure, the mechanism must be duplicated at various positions in each section. Thus, the braking device as disclosed is unable to be applied to a plurality of article carrying rollers simultaneously. An article moving on the conveyor will not be stopped until it reaches the braking roller, and thus, an article traveling behind the first article will come into contact therewith, and apply pressure thereto in order to be stopped. It can be readily seen that the braking roller would be required to be spaced a distance apart that is less than the dimension of the article being propelled along the conveyor, in order to reduce the amount of pressure between articles that are stopped. The cost and inconvenience of providing a large quantity of braking rollers is readily overcome with the use of the instant invention.

In U.S. Pat. No. 3,323,636 issued to Gotham on June 6, 1967, there is disclosed a power driven roller conveyor which is driven from below by a moving belt urged into contact with the article supporting rollers by spring-actuated pulleys which limit the frictional driving force on the several driven rollers. The rollers require continual adjustment in order to insure the proper amount of frictional contact between the moving belt and the supporting rollers, since the spring tension varies with time and temperature. A braking apparatus for stopping the moving articles on the conveyor is not disclosed therein.

In U.S. Pat. No. 3,232,415 issued to Gotham on Feb. 1, 1966, there is disclosed a power driven roller system with an apparatus to allow and compensate for accumulation of articles being conveyed while the conveyor is in operation. The disclosed apparatus utilizes a bearingless roller accumulation conveyor which includes a sloped bracket mechanism disposed beneath the rollers and encompassing the drive belt. The rollers are permitted to move in a horizontal direction by the driving belt and may be urged in the opposite horizontal direction when packages traveling on the supporting rollers start to accumulate providing forces in the opposite horizontal direction. By moving a supporting roller in the opposite or reverse direction, the supporting roller moves rearwardly up the ramp of the U-shaped bracket and out of contact with the drive belt, thereby stopping further accumulation of the packages on the conveyor.

In U.S. Pat. No. 4,273,239 issued to J. A. Thwaites et al on June 16, 1981, a zero pressure accumulator conveyor is disclosed which includes a combination propelling and braking apparatus that applies braking forces to a plurality of supporting rollers in a first or normal position and is moved to a second or driving position wherein a drive belt is placed in intimate frictional contact with the supporting rollers while removing the braking forces. The apparatus disclosed therein utilizes an expansible tube disposed between the driving belt mechanism and the braking mechanism and is shiftable from the first or normal braking position to the second or driving position by permitting pressurized fluid to enter the expansible tube. The system is maintained in the stopped or normal (first) position with the braking forces applied when there is no pressurized fluid in the expansible tube.

SUMMARY OF THE INVENTION

Therefore, it is an object of the present invention to provide a propelling and braking apparatus for a zero pressure accumulator conveyor which does not rely on the contact between articles moving along the supporting rollers to stop their movement.

Another object of the present invention is to provide a propelling and braking apparatus for a zero pressure accumulator that maintains the propelling apparatus in intimate driving or propelling contact with the supporting rollers in a normal or non-activated position.

It is a further object of the present invention to provide a propelling and braking apparatus for a zero pressure accumulator that provides braking forces to a plurality of supporting rollers in a direction perpendicular to the axis of the supporting rollers.

It is yet another object of the present invention to provide a propelling and braking apparatus for a zero pressure accumulator that truly has zero pressure between articles moving along the surface of the supporting rollers even when the conveyor is not disposed in a level position.

It is a further object of the present invention to provide a propelling and braking apparatus for a zero pressure accumulator which may be affixed to and disposed between the side rails of a conventional conveyor system providing all of the features described hereinbefore.

The instant invention overcomes the shortcomings found in the art by providing uniform pressure to all of the article carrying rollers (supporting rollers) when the conveyor is in its normal propelling mode and provides equal braking pressure to all of the supporting rollers in a section in its braking mode. Moreover, if the pressurized fluid source should fail all of the articles will be propelled to the end of the conveyor. Thus, a relatively simple, inexpensive apparatus is now available which is capable of providing smooth propelling forces for articles moving along the conveyor and does not require contact between the articles in order to have them come to rest.

A zero pressure accumulator conveyor, according to the principles of the present invention, comprises a plurality of sections arranged in tandem, each section includes a pair of side rails and a plurality of article supporting rollers disposed at spaced intervals therebetween. A driving apparatus disposed between the side rails includes a mounting bracket adapted to be affixed to one of the side rails and provides a driven belt which is normally biased into intimate contact with a plurality of the supporting rollers while being resiliently affixed to the mounting bracket. A braking device is disposed between said side rails on the mounting bracket proximate the driven belt and is also resiliently affixed to the mounting bracket. A pressurized fluid source is operably coupled to an expansible tube disposed between the driving apparatus and a braking device; the expansible tube when expanded moves the braking perpendicular to the axis of the article support rollers to provide braking forces to the rollers and removes the driving apparatus out of contact with the rollers.

According to the principles of the present invention, in a zero pressure accumulator conveyor which has a plurality of sections arranged in tandem with each section including a pair of side rails and a plurality of article supporting rollers at spaced intervals therebetween and an article detecting sensor located in each of the sections being operatively coupled to a pressurized fluid source and a driving source, the improvement comprises, mounting apparatus disposed between the side rails adapted to be affixed to one of the side rails beneath the article supporting rollers. A driven belt is normally biased into intimate contact with a plurality of the supporting rollers and is adapted to be driven from the driving source. A first U-shaped bracket resiliently is coupled to the mounting apparatus. The arm portions of the first U-shaped bracket is provided with apertures and extends upwardly towards the article supporting rollers. A second U-shaped bracket is disposed within the opening of the first U-shaped bracket and faces in the same direction. The arm portions of the second U-shaped bracket is provided with elongated apertures and has a braking device disposed on the distal end of at least one arm thereof. A pulley has an axle which is slidably received by the apertures and the elongated apertures. The pulley is normally biased and operatively coupled into intimate contact with the driven belt. An expansible tube disposed between the horizontal portions of the first and second U-shaped bracket is adapted to be coupled to the article detecting sensor and the pressurized fluid source. The expansible tube causes the braking device to engage a plurality of the article supporting rollers only when fluid is permitted to enter the expansible tube by the article detecting sensor controlling the ingress and egress of fluid from the expansible tube and applies braking forces perpendicular to the axis of the supporting rollers.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that the structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
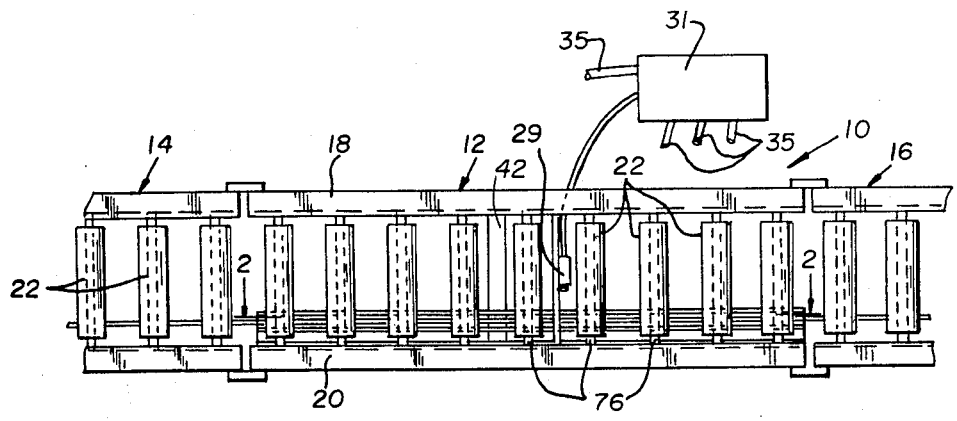
FIG. 1 is a top plan view of the zero pressure accumulator, according to the principles of the present invention.
Figure 2:
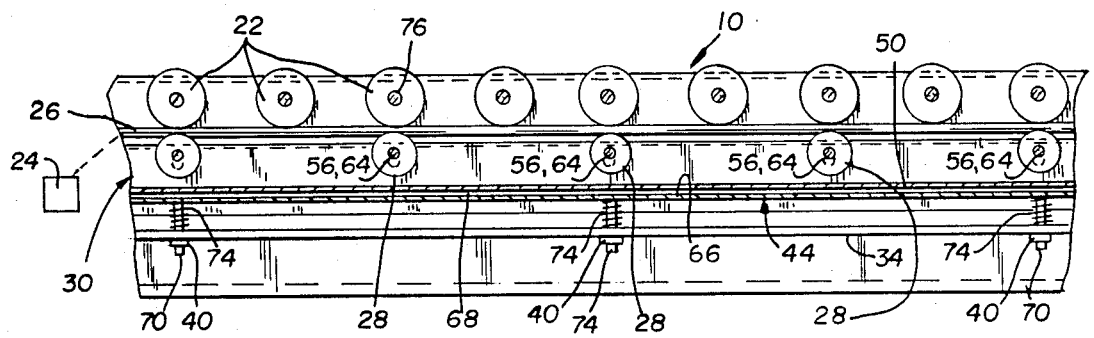
FIG. 2 is a slightly enlarged elevational view taken along the line 2—2 of FIG. 1.

Referring now to the figures, and in particular to FIGS. 1 and 2 which disclose a zero pressure accumulator conveyor 10, according to the principles of the present invention. The accumulator conveyor 10 includes a plurality of sections 12, 14 and 16, which are identical in construction and arranged in tandem. Each section 12 includes a pair of side rails 18 and 20 and a plurality of article supporting rollers 22 journaled at spaced intervals along the length of the side rails. Also included is a driving or propelling apparatus 24 which includes a source of motivating power, operatively coupled to a driving belt 26, the operation thereof will be discussed hereinafter in more detail. The driving belt 26 is arranged to be in intimate contact with the pulleys or rollers 28 of the propelling and braking apparatus 30. The accumulator conveyor 10 additionally includes an expansible tube member 68 which is adapted to be connected, via an article sensing device 29 centrally disposed between the side rails 18 and 20. The sensing device 29 has a portion thereof which extends upwardly beyond the surface of the supporting rollers 22 for sensing the presence of articles, not shown, moving along the surface of the supporting rollers. The article sensing device 29 functions as a control mechanism for the pressurized fluid contained in a pressurized resevoir 31 and controls the egress and ingress of fluid flowing from the reservoir 31, via the fluid conducting tubes 36, to the expansible tube 8.

The propelling and braking apparatus 30 has two separate, independent modes of operation, one being the normal or propelling mode wherein the driving belt 26 is biased into intimate frictional contact with the article supporting rollers thereby propelling an article appearing on the conveyor 10 along the length of the conveyor, and a second or braking mode wherein the article supporting rollers are in intimate frictional contact with the braking material 12 provided on the distal end of braking assembly 33.

Figure 3:
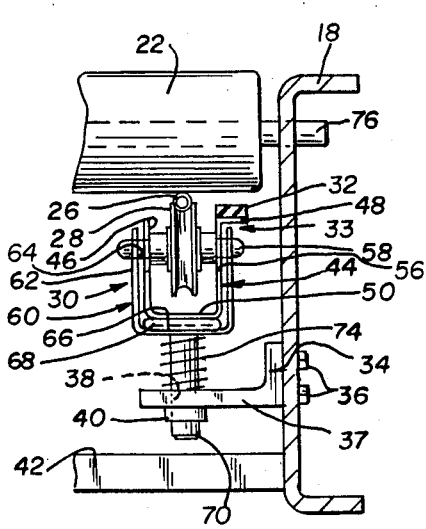
FIG. 3 is an enlarged partial view in elevation of the propelling and braking mechanism of the instant invention in its propelling position.
Figure 4:
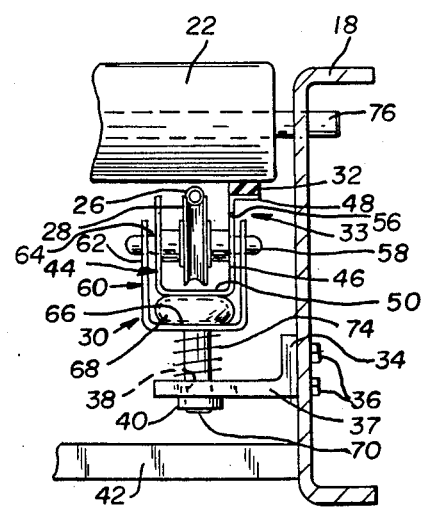
FIG. 4 is a view similar to that shown in FIG. 3, except that the apparatus is in its braking mode of operation.

In the preferred embodiment of the present invention, shown in FIGS. 3 and 4, a mounting bracket or support 34 is affixed to one side rail 20 of the conveyor 10, in a conventional manner, such as by threaded bolts 36, and is arranged to have extending portion 37 preferably arranged to be perpendicular to the side rail 20. The mounting bracket 34 is provided with a plurality of apertures 38 spaced along its length which are adapted to fixedly receive Oilite bushings 40 therein. A stiffening bracket 42 may be utilized at equally spaced intervals along the entire length of side rails 18 and 20 in order to insure that the side rails remain in a fixed vertical position.

A U-shaped bracket 44, which may be made to extend the entire length of the side rails or any portion thereof, is positioned to have its arms 46 extend upwardly toward the article supporting rollers 22. One or both of the arms of the U-shaped bracket 44 is provided with an outwardly extending portion 48 onto which is affixed a braking material 32, in a conventional manner such as by riveting or by an adhesive material, etc. The braking material 32 may be either rubber, asbestos, or any other material which is capable of providing frictional braking power with a minimum of wear associated therewith. The arms 46 of U-shaped bracket 44 are provided with a plurality of elongated slots or apertures 56 equally spaced along the length thereof. The slots 56 extend upwardly and are adapted to receive the axle 58 of pulley or roller 28, so that it may freely rotate therein and also move in a vertical direction.

A second U-shaped bracket 60, having arms 62, is made slightly wider than U-shaped bracket 44 and is adapted to receive the bracket 44 into the open portion thereof, and extend almost its entire length. The arms 62 are provided with holes or apertures 64 which coincide with the slots 56 in U-shaped bracket 44, and also are adapted to receive the axle 58 of the pulley 28. An Oilite bearing (not shown) may also be included in aperture 64. The bottom portion 66 of the U-shaped bracket 60 is provided with a downwardly extending shaft 70 adapted to be slidably received by the bushing 40 which is affixed in the mounting bracket 34. A coil spring 74 is disposed between the mounting bracket 34 and the underside of the bottom portion 66 of the U-shaped bracket 60. Preferably the shaft 70 is welded to the bottom portion 66. However, any other means of affixing the shaft 70 to the U-shaped bracket 60 is acceptable as long as the upper surface of the bottom portion 66 remains essentially flat. The reason for this will become obvious shortly.

Disposed between the upper surface of the bottom portion 66 of the U-shaped bracket 60 and the bottom surface of the bottom portion 50 of the U-shaped bracket 44 is an expansible tube 68, which is shown in its collapsed position in FIG. 3 and in its expanded position in FIG. 4. If a reversible conveying system is to be utilized, an expansible tube member having two independent chambers adapted to receive fluid under pressure, is required. The function of the separate air chambers in this type of arrangement is described in more detail in U.S. Pat. No. 4,273,239.

In operation, the pressurized fluid from reservoir 31 is prohibited from flowing into the expansible tube 68 with the sensor 29 out of contact with an article moving along the surface of supporting rollers 22, thereby permitting the drive belt 26 to be in intimate frictional contact with the surface of the supporting rollers 22. With driving power being coupled to drive belt 26 which is in contact with the surface of the supporting rollers 22, they are caused to rotate on their axles 76, thereby causing an article disposed on the surface thereof to be propelled along the length of the conveyor until it comes into contact with the article sensing device 29. An article coming into contact with the article sensing device 29, will activate it, thereby permitting the pressurized fluid from the reservoir 31 to flow into expansible tube 68 causing it to expand and assume the position as shown in FIG. 4. As expansible tube 68 expands, it raises the braking assembly 33 causing the braking material 32 to come into intimate contact with the surface of the supporting roller 22 providing sufficient friction to cause the supporting roller to cease rotation. Simultaneously, the driven belt 26 is taken out of contact with the surface of the supporting rollers 22 since bracket 44 is urged in a downwardly direction by expansible tube 8. With the driven belt 26 out of contact with the surface of supporting roller 22, all propelling forces are removed from the supporting rollers and articles on the surface of the supporting rollers would stop their forward movement. Permitting the pressurized fluid to escape from the expansible tube will permit the articles to be propelled along the conveyor again.

It is to be noted that the sensor 29, although located in the first section, applies the braking forces in a section next upstream therefrom. The fluid most easily utilized in this type of application is compressed air which is readily available in large manufacturing facilities handling the movement of materials.

Hereinbefore has been disclosed a true zero pressure accumulator and braking apparatus, which may be utilized on a conventional conveyor presently in use today. With braking forces applied to all the supporting rollers, it is not necessary for the conveyor to be maintained in a perfectly horizontal position in order to maintain zero pressure between articles moving on the surface of the supporting rollers.

It will be understood that various changes in details, materials, arrangement of parts and operating conditions which have been described and illustrated in order to explain the nature of the invention, may be made by those skilled in the art within the principles and the scope of the present invention.

Having thus set forth the nature of the invention, what is claimed is:

1. A zero pressure accumulator conveyor comprising:
   (a) a plurality of sections arranged in tandem, each section including a pair of side rails and a plurality of article supporting rollers at spaced intervals therebetween;
   (b) driving means disposed between said side rails including:
      (i) mounting means affixed to one of said side rails beneath said article supporting rollers,
      (ii) driven belt means normally biased into intimate contact with a plurality of said supporting rollers,
      (iii) first U-shaped bracket means resiliently coupled to said mounting means, the arm portions of said first U-shaped bracket means being provided with apertures and extending upwardly towards said article supporting rollers,
      (iv) second U-shaped bracket means disposed within the opening of said first U-shaped bracket means and facing in the same direction, the arm portions of said second U-shaped bracket means being provided with elongated apertures and having braking means disposed on the distal end of at least one arm thereof,
      (v) roller means having an axle which is rotatably received by said apertures and said elongated apertures, said roller means being operatively coupled to and in intimate contact with said driven belt means, and
      (vi) expansible tube means disposed between the horizontal portions of said first and second U-shaped bracket means and adapted to be operatively coupled to an article detecting sensor and a pressurized fluid source, said expansible tube means causing said braking means to engage a plurality of said article supporting rollers and remove said driven belt means from contact with said supporting rollers when fluid is permitted to enter said expansible tube means by said article detecting sensor that controls the ingress and egress of fluid to said expansible tube means, said sensor being activated by an article moving along said conveyor.

2. In a zero pressure accumulator conveyor having a plurality of sections arranged in tandem, each section including a pair of side rails and a plurality of article supporting rollers at spaced intervals therebetween, an article detecting sensor located in each said section operatively coupled to a pressurized fluid source and a driving means, the improvement comprising:
   (a) mounting means disposed between said side rails for affixment to one of said side rails beneath said article supporting rollers;
   (b) belt means normally biased into intimate contact with a plurality of said supporting rollers and adapted to be driven from said driving means;
   (c) first U-shaped bracket means resiliently coupled to said mounting means, the arm portions of said first U-shaped bracket means being provided with apertures and extending upwardly towards said article supporting rollers;
   (d) second U-shaped bracket means disposed within the opening of said first U-shaped bracket means and facing in the same direction, the arm portions of said second U-shaped bracket means being provided with elongated apertures and having braking means disposed on the distal end of at least one arm thereof;
   (e) roller means having an axle which is rotatably received by said apertures and said elongated apertures, said roller means normally being biased to be operatively coupled to and in intimate contact with said driven belt means;
   (f) expansible tube means disposed between the horizontal portions of said first and second U-shaped bracket means adapted to be coupled to said article detecting sensor and said pressurized fluid source, said expansible tube means causing said braking means to engage a plurality of said article supporting rollers when fluid is permitted to enter said expansible tube means by said article detecting sensor controlling the ingress and egress of fluid from said expansible tube means and applying braking forces perpendicular to the axis of said supporting rollers, said expansible tube means causing said braking means to engage said article supporting rollers only when containing fluid therein.

3. A zero pressure accumulator conveyor according to claims 1 or 2 wherein said mounting means includes a coil spring member and a horizontally disposed bearing having a coaxial aperture therein for slidably receiving a support rod depending from the horizontal portion of said first U-shaped bracket.

* * * * *